United States Patent [19]

Cheng et al.

[11] Patent Number: 4,771,188

[45] Date of Patent: Sep. 13, 1988

[54] ADAPTIVE THRESHOLD ADJUSTMENT METHOD AND APPARATUS

[76] Inventors: Jyi-Min Cheng, 6997 Blue Hill Dr., San Jose, Calif. 95129; Julian H. Van Wyngaarden, 251 Emerson, #5, Palo Alto, Calif. 94301

[21] Appl. No.: 29,310

[22] Filed: Mar. 23, 1987

[51] Int. Cl.$^4$ .................... H03K 5/153; H03K 5/24
[52] U.S. Cl. .................... 307/351; 307/358; 328/150
[58] Field of Search ............ 307/351, 360, 358; 328/150, 116, 117, 164

[56] References Cited

U.S. PATENT DOCUMENTS 3,375,450 3/1968 Ayres et al. .................... 328/150
4,479,266 10/1984 Eumurian et al. .................... 307/358
4,574,206 3/1986 Todokoro et al. .................... 328/164

*Primary Examiner*—John Zazworsky
*Attorney, Agent, or Firm*—Townsend & Townsend

[57] ABSTRACT

A method and apparatus for instantaneously adjusting the threshold level for amplitude qualification in a signal peak detection system. Two threshold levels are provided, an upper threshold level and a lower threshold level. As the input signal level exceeds a first qualifying value, the amplitude threshold is set to the lower threshold level. If the input signal continues to increase and exceeds a second qualifying value higher than the first qualifying value, the amplitude threshold is set to the upper threshold level.

11 Claims, 5 Drawing Sheets

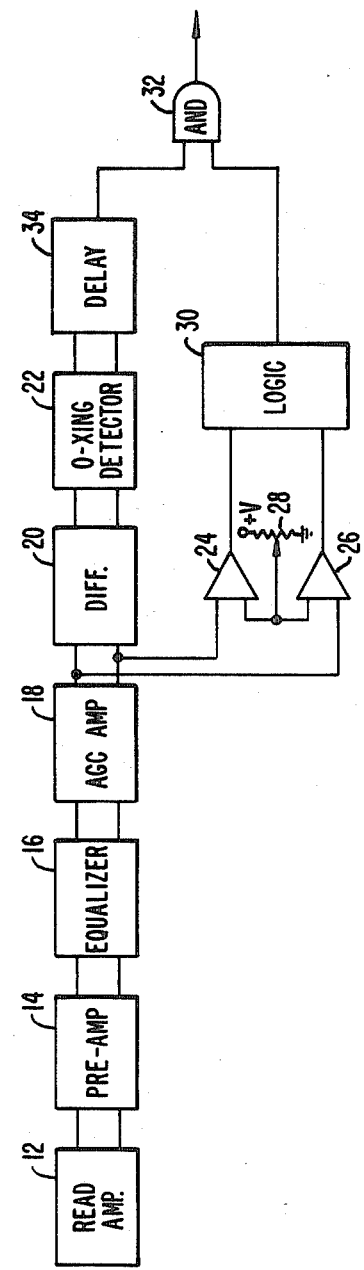
FIG._1.
PRIOR ART

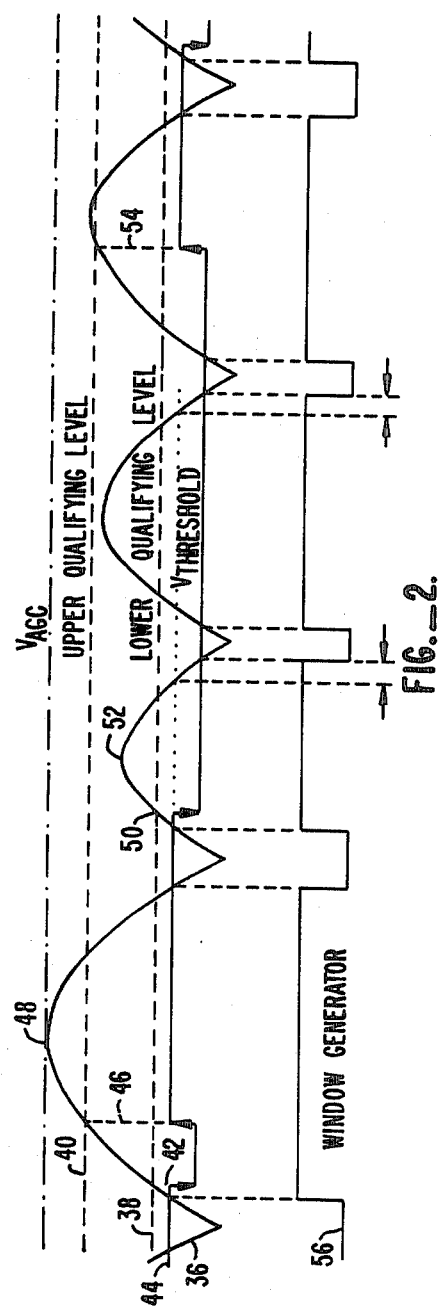
FIG._2.
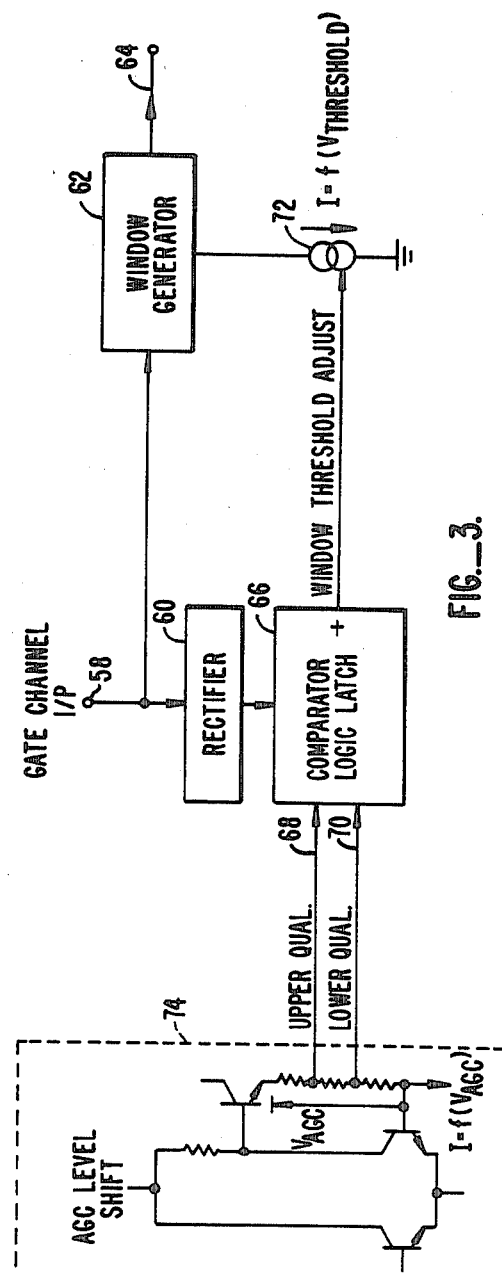
FIG._3.

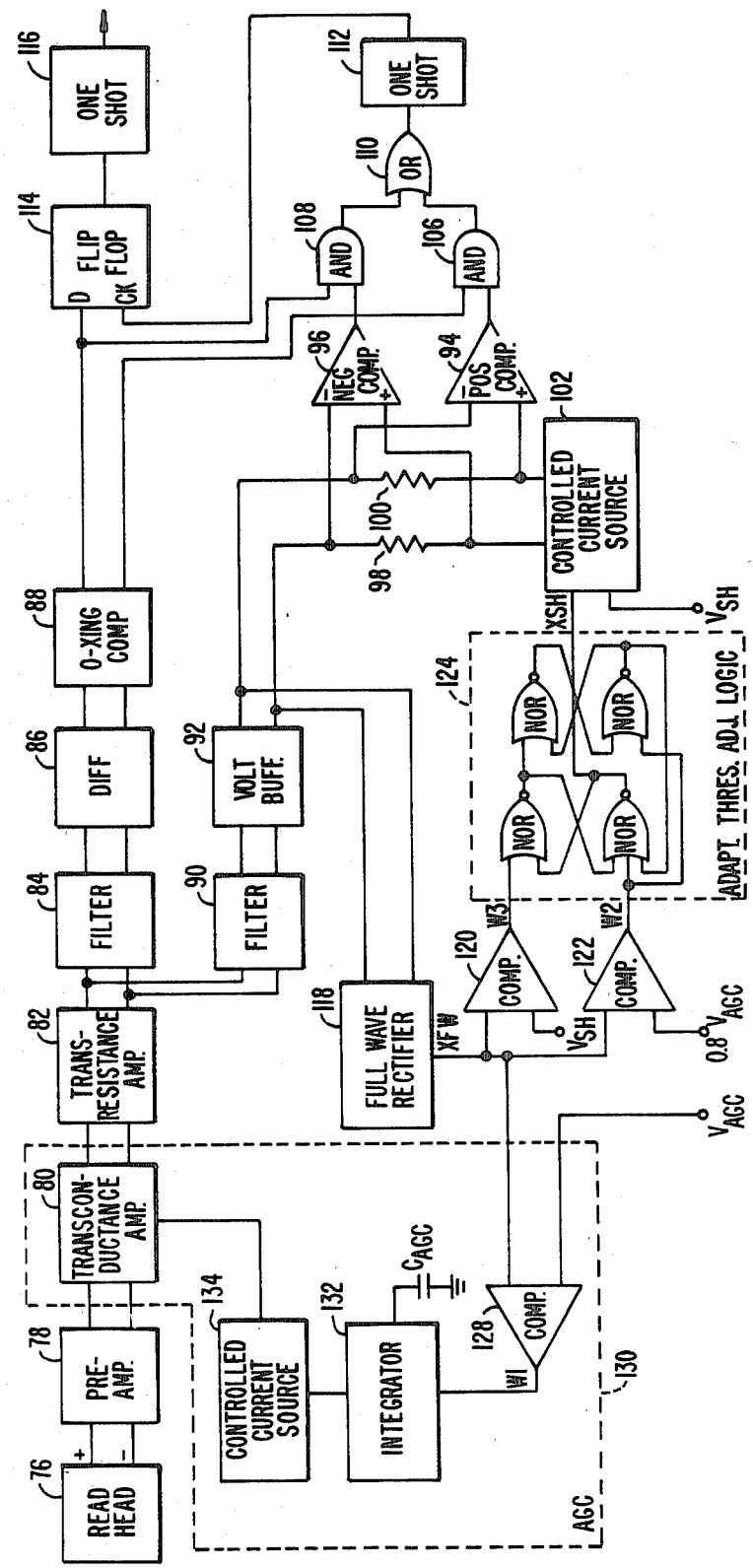
FIG._4.

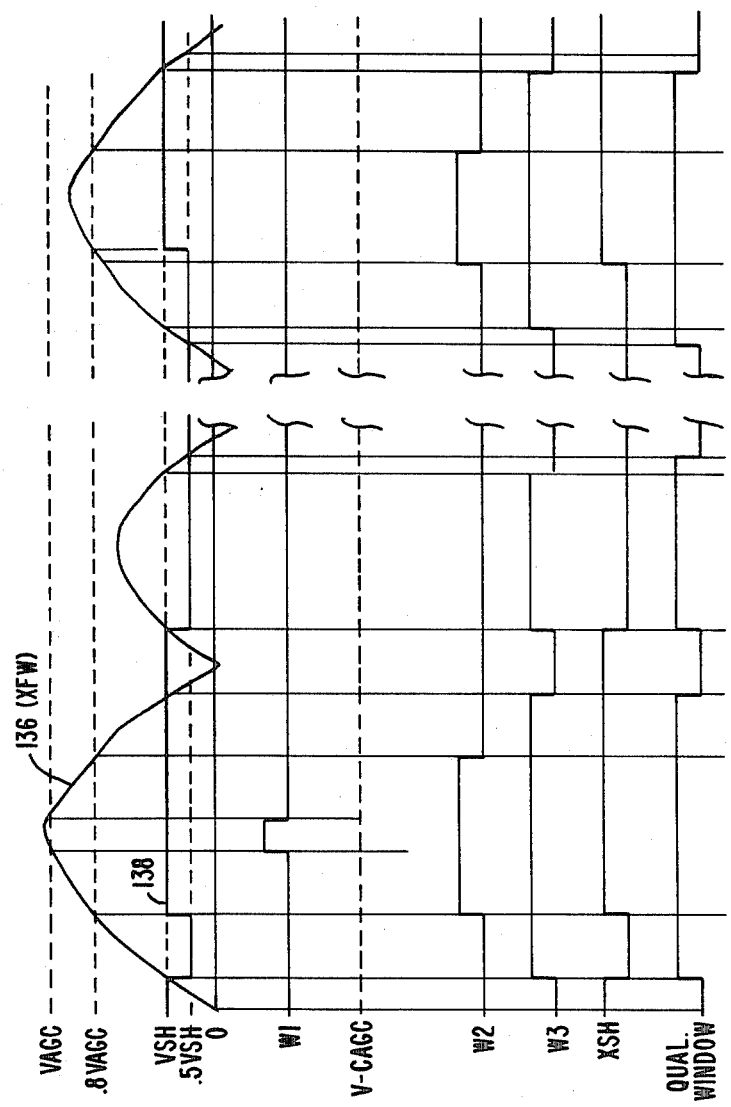
FIG._5.

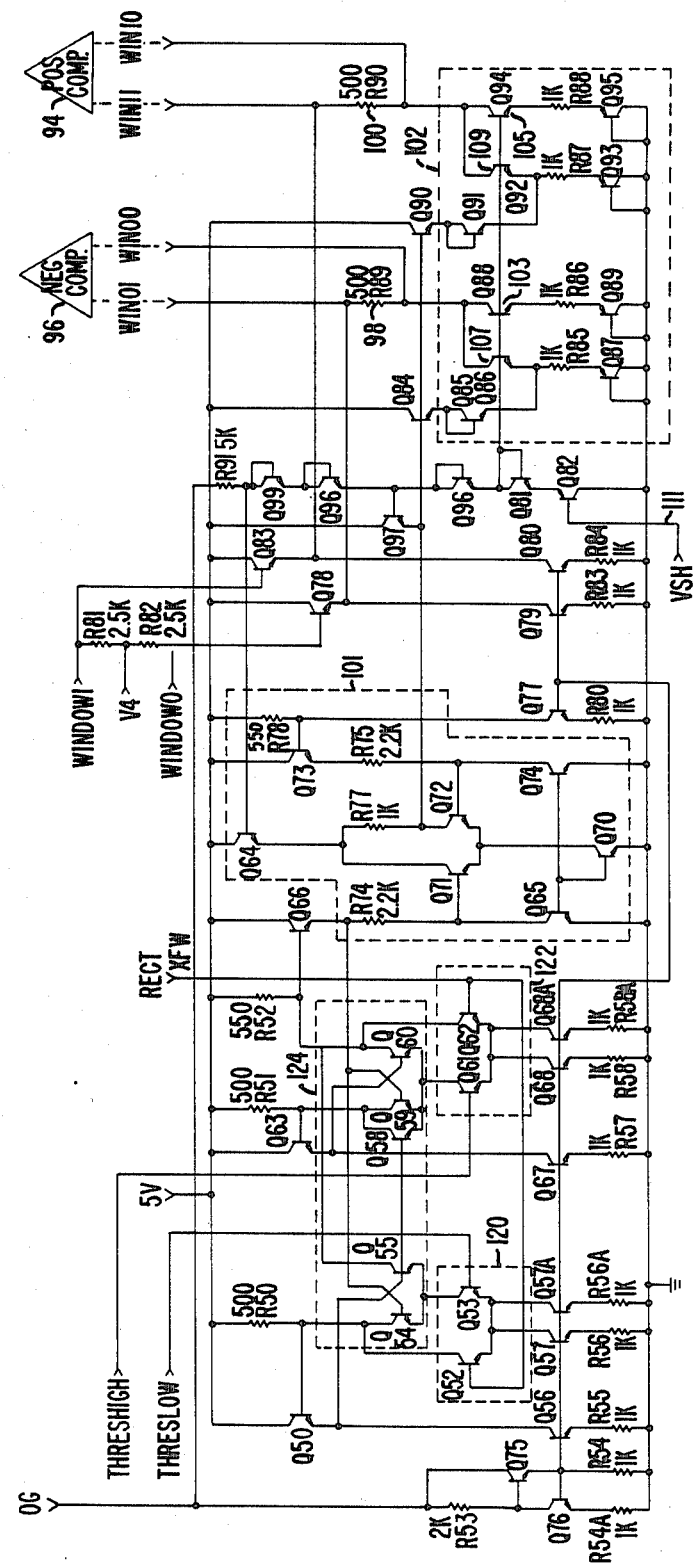
FIG._6.

ADAPTIVE THRESHOLD ADJUSTMENT METHOD AND APPARATUS

BACKGROUND

The present invention relates to amplitude qualification of peaks in a signal peak detection system, and, more particularly, to the setting of a reference level for the amplitude qualification.

In order to reconstruct binary data recorded upon a magnetic disc, the polarity-reversing magnetic flux peaks must be detected and converted into digital pulses. One method of eliminating false data due to spurious peaks or noise is to require that any peak be of a minimum amplitude in order to be considered as a possible data peak. Such a system is shown in FIG. 1 and disclosed in U.S. Pat. No. 4,081,756 to Price, et al.

Referring to FIG. 1, a disc read head 12 converts magnetic flux reversals into a signal which is processed through a preamplifier 14 and an equalizer 16. An automatic gain control amplifier 18 adjusts the gain in response to changes in signal level. The signal is then processed through a differentiator 20, the output of which is connected to a zero crossing detector 22. The zero crossings will correspond to peaks of the detected signal. In a separate channel, the signal is provided to a pair of comparators 24, 26 which receive a reference input from a potentiometer 28. The output of comparators 24, 26 is provided through a series of logic gates 30 and to an AND gate 32. Thus, any signal which exceeds, in either the positive or the negative direction, the threshold set by potentiometer 28 will produce a logical one at one input of AND gate 32. The other input of AND gate 32 is an output of zero crossing detector 22 indicating a peak. This output is delayed by a delay circuit 34 so that the two channel paths are equal. The output of AND gate 32 thus provides an indication of a peak only if the peak exceeds an amplitude set by potentiometer 28.

One problem with the use of amplitude qualification is that the signal level may vary from point to point on a magnetic disc. For instance, near the center of the disc where the bits are packed more closely together, the signal level will be smaller. One method of compensating for this is to make the amplitude threshold a percentage of the signal level. This method is shown in U.S. Pat. No. 4,001,884 to Herbst. Such a system, however, relies upon an RC circuit to follow the signal level, and thus cannot instantaneously adjust to changes in signal level.

SUMMARY OF THE INVENTION

The present invention is a method and apparatus for instantaneously adjusting the threshold level for amplitude qualification in a signal peak detection system. Two threshold levels are provided, an upper threshold level and a lower threshold level. As the input signal level exceeds a first qualifying value, the amplitude threshold is set to the lower threshold level. If the input signal continues to increase and exceeds a second qualifying value higher than the first qualifying value, the amplitude threshold is set to the upper threshold level.

Thus, for each individual peak, the lower threshold level is assumed to be the proper level for amplitude qualification until the peak exceeds a higher value. Accordingly, for low signal levels, the lower threshold will be used, but the instant a peak exceeds a higher level, the higher threshold value will be used.

In the preferred embodiment, the differential input signal is applied to the negative inputs of a pair of comparators. These inputs are each coupled via a resistance to the respective comparator's positive input, which are each coupled to a current source which sets the voltage threshold level. The input signal is rectified and provided to a logic circuit which compares the rectified input signal to a pair of qualifying voltage levels. The output of this logic circuit is used to control the threshold level for the amplitude qualification by controlling the current sources. Each current source uses two current source transistors, with one transistor being switched off for the lower threshold voltage and both transistors being switched on for the upper threshold voltage.

In one embodiment, the upper and lower threshold levels are themselves varied under the control of an automatic gain control circuit to maintain the two threshold levels as constant percentages of the input signal.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram of a prior art peak detection system using amplitude qualification;

FIG. 2 is a timing diagram showing the variation in signal and threshold levels according to the present invention;

FIG. 3 is a block diagram of an adaptive threshold adjustment circuit according to the present invention;

FIG. 4 is a block diagram of the circuit of FIG. 3 incorporated into an amplitude and time qualification peak detection system; and FIG. 5 is a timing diagram for various signals in the embodiment of FIG. 4.

DETAILED DESCRIPTION OF THE PREFERRED EMBODIMENTS

FIG. 2 graphically shows the adaptive threshold adjustment method of the present invention. A rectified input signal 36 having a series of peaks is shown. Signal 36 is compared to a lower qualification level 38 and an upper qualification level 40. At a time 42 when signal 36 exceeds qualification level 38, a voltage threshold signal 44 is adjusted from its upper threshold level to its lower threshold level. At a later time 46 when signal 36 exceeds upper qualification level 40, voltage threshold 44 is raised from its lower threshold level to its upper threshold level. Thus, when peak 48 of signal 36 is reached, it is compared to the upper threshold level of voltage threshold 44.

The next time signal 36 exceeds qualification level 38 at a time 50, voltage threshold 44 again drops to its lower level. In this instance, a peak 52 is reached without signal 36 exceeding upper qualification level 40. Accordingly, peak 52 is compared to the lower threshold value of voltage threshold 44. This peak thus qualifies as a data peak. The lower threshold level will remain in effect until signal 36 again exceeds the upper qualifying level at a time 54. The upper and lower qualifying levels are different from the upper and lower threshold levels. This is because the threshold levels are a small proportion of the peak values designed to eliminate noise, while the qualifying levels are chosen to detect changes in total peak amplitude.

Also shown in FIG. 2 is a window signal 56 which serves to enable the output of the peak detection system. As can be seen, the use of a lower threshold level for the smaller peaks provides a wider window than would be provided with a fixed threshold level. The extra window margin insures that these smaller peaks will be detected.

FIG. 3 shows a block diagram of an adaptive threshold adjustment circuit according to the present invention. The input signal is provided on a line 58 to a rectifier 60 and a window generator 62. Window generator 62 compares the input signal to a voltage threshold and provides a high level output on line 64 if the signal exceeds the threshold. The rectified signal from rectifier 60 is provided to a comparator logic and latch circuit 66. Logic circuit 66 compares the rectified signal to an upper qualification level 68 and a lower qualification level 70. The output of logic circuit 66 controls a current source 72 which in turn varies the voltage threshold of window generator 62. The circuit of FIG. 3 is operated as shown in FIG. 2 to vary the threshold voltage and produce an appropriate window signal which is provided to an enabling input of a peak detection system. The upper and lower qualification levels 68 and 70 are optionally provided by an automatic gain control (AGC) level shift circuit 74. The use of an AGC circuit thus provides that both the upper and lower qualification levels can be adjusted to provide another degree of adjustment in addition to the two threshold levels.

FIG. 4 shows the adaptive threshold adjustment circuit according to the present invention incorporated into a novel peak detection system using both amplitude and time qualification. The time qualification only allows one peak to be detected in each specified time period, thus further reducing errors in data pulse detection. The operation and construction of such a novel amplitude and time qualification peak detection system is discussed in copending application Ser. No. 028,926, filed Mar. 23, 1987.

FIG. 4 shows a read head 76 which picks up a signal from a magnetic disc and supplies it to a preamplifier 78. The signal is then provided to a gain modified amplifier 80 and to a transresistance amplifier 82. The signal then passes through a filter 84 in a first channel to a differentiator 86 and a zero crossing converter 88 for detecting peaks. The signal from amplifier 82 is also provided in a second channel to a filter 90 and a voltage buffer 92. The positive and negative outputs of the differential signal from voltage buffer 92 are provided to a positive threshold comparator 94 and a negative threshold comparator 96, respectively. The other inputs to these comparators are provided from the other side of resistors 98 and 100 to provide a voltage reference threshold as set by current sources in a controlled current source circuit 102. Either an upper or a lower threshold will be provided by controlled current source 102.

The output of threshold comparators 94 and 96 are ANDed in AND gates 106 and 108, respectively, with detected positive and negative differential peaks from zero crossing comparator 88. Thus, the peaks are amplitude qualified. If there is either a positive or negative peak which meets the appropriate amplitude threshold, this will be passed through OR gate 110 to a one shot 112 which then clocks a flip-flop 114. The D input of flip-flop 114 is provided from zero crossing comparator 88. One shot 112 provides a time qualification in addition to the amplitude qualification so that each detected peak must be at least a minimum time from the previous detected peak. The output of flip-flop 114 is provided to a one shot 116 which provides a pulse upon the detection of a properly qualified peak.

The output of voltage buffer 92 is also provided to a full wave rectifier 118. The output of rectifier 118 (XFW) is provided to a pair of comparators 120, 122. Comparators 120 and 122 compare the rectified signal XFW to a lower voltage qualification level (VSH) and an upper voltage qualification level (0.8 VAGC). The outputs of comparators 120 and 122 (W3 and W2) are then provided to an adaptive threshold adjustment logic circuit 124. The output of logic circuit 124 (XSH) is provided to controlled current source 102. As can be seen in FIG. 6, discussed below, controlled current source 102 uses a pair of current source transistors for each of the two outputs coupled to resistors 98 and 100. When signal XSH from logic circuit 124 is low, one of the current source transistors in each pair is disabled, thus cutting the amount of current in half and the voltage threshold in half. When signal XSH is a logic high, both current source transistors in each pair are enabled, thus providing the full value of VSH as the upper threshold.

The voltage threshold value, VSH, is externally provided to controlled current source 102. The level of VSH can optionally be varied by the AGC circuit in the manner shown in FIG. 3.

The XFW signal from rectifier 118 is also provided to a comparator 128 in an automatic gain control loop 130. Comparator 128 compares the rectified signal to the gain voltage, VAGC, and provides an output (W1) to an integrator 132. The output of integrator 132 is provided to a controlled current source 134 which controls the gain of gain modified amplifier 80.

The waveforms of various portions of the circuit of FIG. 4 are shown in the timing diagram of FIG. 5. When the rectified input signal 136 (XFW) exceeds the lower qualifying level (VSH), the voltage threshold signal 138 is dropped from the upper threshold of VSH to the lower threshold of 0.5 VSH. When signal 136 (XFW) exceeds the upper qualifying level of 0.8 VAGC, voltage threshold signal 138 is raised to the upper threshold level of VSH. The setting of the threshold level is done in response to the XSH output of logic circuit 124 in response to inputs W2 and W3 from comparators 120, 122. As can be seen from the timing diagram, the output of the adaptive threshold adjustment logic circuit 124 (XSH) will be at a logic high whenever both of inputs W2 and W3 are the same. When W2 is a low level and W3 makes a transition from a low to a high level, XSH will be a low level. The condition of W3 being low and W2 being high will never arise because W3 is always activated prior to W2 since it is a lower qualification level.

As will be understood by those familiar with the art, the present invention may be embodied in other specific forms without departing from the spirit or essential characteristics thereof. For example, automatic gain control 130 could be optionally left out or only amplitude qualification could be used without the addition of a time window (one-shot 112) as shown in FIG. 4. Accordingly, the disclosure of the preferred embodiments of the invention is intended to be illustrative, but not limiting of the scope of the invention which is set forth in the following claims.

What is claimed is:

1. A method for adjusting a signal threshold above which peaks in an input signal are detected in a signal peak detection system, comprising the steps of:
   providing a lower thresholod value;
   providing an upper threshold value;
   adjusting said signal threshold to said lower threshold value when or before said input signal exceeds a first qualifying value on a rising edge of a signal peak;
   adjusting said signal threshold to said upper threshold value when said input signal exceeds a second qualifying value on a rising edge of a signal peak, said second qualifying value being larger than said first qualifying value; and
   comparing a peak of said input signal to said signal threshold.

2. The method of claim 1 further comprising the step of rectifying said input signal prior to said adjusting and comparing steps.

3. The method of claim 1 further comprising the steps of providing a pair of current source transistors to control said signal threshold, disabling one of said transistors to provide said lower threshold value and enabling both of said transistor to provide said upper threshold value.

4. The method of claim 1 wherein said first qualifying level is greater than said lower threshold value and said second qualifying value is greater than said upper threshold value.

5. In a peak detection system for detecting peaks of an input signal above a threshold value, the improvement comprising:
   means for generating said threshold value;
   means for generating a first qualifying signal;
   means for generating a second qualifying signal larger than said first signal;
   means for comparing said input signal to said first and second qualifying signals;
   means for adjusting said threshold value to a lower threshold level when or before said input signal exceeds said first qualifying signal and to an upper threshold level when said input signal exceeds said second qualifying signal on a rising edge of a signal peak; and
   means for comparing a peak of said input signal to said threshold value.

6. The improvement of claim 5 further comprising a full wave rectifier for rectifying said input signal and providing a rectified input signal to said means for comparing.

7. The improvement of claim 6 wherein said means for comparing comprises:
   a first comparator having a first input coupled to receive said rectified input signal, a second input coupled to said means for generating a first qualifying signal, and an output, said first comparator generating a high level output signal when said rectified input signal exceed said first qualifying signal; and
   a second comparator having a first input coupled to receive said rectified input signal, a second input coupled to said means for generating a second qualifying signal, and an output, said second comparator generating a high level output signal when said rectified input signal exceeds said second qualifying signal.

8. The improvement of claim 7 further comprising logic means for generating a high level output when said second comparator input transitions to a high level and a low level output when said first comparator output transitions to a high level, said logic means output being provided to said means for adjusting.

9. The improvement of claim 5 wherein said means for generating said threshold value is a resistor and a current source coupled to said resistor and said means for adjusting is operative to vary an amount of current generated by said current source.

10. The improvement of claim 5 wherein said means for adjusting said threshold value includes at least a pair of current source transistors and means for disabling one of said transistors to produce said lower threshold value.

11. In a peak detection system for detecting peaks of an input signal above a threshold signal, the improvement comprising:
   means for generating said threshold signal;
   means for generating a first qualifying signal;
   means for generating a second qualifying signal larger than said first signal;
   a full wave rectifier for rectifying said input signal and providing a rectified input signal;
   a first comparator having a first input coupled to receive said rectified input signal, a second input coupled to said means for generating a first qualifying signal, and an output, said first comparator generating a high level output signal when said rectified input signal exceeds said first qualifying signal;
   a second comparator having a first input coupled to receive said rectified input signal, a second input coupled to said means for generating a second qualifying signal, and an output, said second comparator generating a high level output signal when said rectified input signal exceeds said second qualifying signal;
   a pair of current source transistors; and
   means, coupled to said comparators, for disabling one of said transistors to produce said lower threshold value of said threshold signal when said rectified input signal exceeds said first qualifying signal and enabling said transistor when said rectified input signal exceeds said second qualifying signal to produce a higher threshold value of said threshold signal.

* * * * *